US012605976B2

(12) United States Patent
Hurley et al.

(10) Patent No.: US 12,605,976 B2
(45) Date of Patent: Apr. 21, 2026

(54) SYSTEM AND METHOD FOR FAILSAFE OPERATION OF A TRACTOR PROTECTION CONTROL MODULE

(71) Applicant: Bendix Commercial Vehicle Systems LLC, Avon, OH (US)

(72) Inventors: Ryan S. Hurley, Lakewood, OH (US); Randy J. Salvatora, Columbia Station, OH (US); Subashish Sasmal, Avon, OH (US); Edward F. Hoban, Cleveland, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 641 days.

(21) Appl. No.: 18/077,641

(22) Filed: Dec. 8, 2022

(65) Prior Publication Data

US 2024/0190191 A1 Jun. 13, 2024

(51) Int. Cl.
| *B60D 1/28* | (2006.01) |
| *B60D 1/36* | (2006.01) |
| *B60T 7/04* | (2006.01) |
| *B60T 7/20* | (2006.01) |
| *F16K 15/00* | (2006.01) |

(52) U.S. Cl.
CPC ................ *B60D 1/28* (2013.01); *B60D 1/36* (2013.01); *B60T 7/04* (2013.01); *B60T 7/20* (2013.01); *F16K 15/00* (2013.01)

(58) Field of Classification Search
CPC .... B60D 1/28; B60D 1/36; B60T 7/04; B60T 7/20; B60T 13/263; B60T 13/662; B60T 13/683; F16K 15/00
See application file for complete search history.

(56) References Cited

U.S. PATENT DOCUMENTS

| 5,061,015 | A | | 10/1991 | Cramer et al. | |
| 6,062,652 | A | * | 5/2000 | Eberling | B60T 15/48 |
| | | | | | 303/64 |
| 9,758,140 | B2 | | 9/2017 | Eberling et al. | |
| 10,442,418 | B2 | | 10/2019 | Niglas et al. | |
| 2005/0023888 | A1 | | 2/2005 | Knight | |

(Continued)

FOREIGN PATENT DOCUMENTS

| EP | 3 954 589 A1 | 2/2022 |
| GB | 2131509 A | 6/1984 |

(Continued)

OTHER PUBLICATIONS

WO document No. WO 2009046780 to Foerster et al published on Apr. 16, 2009.*

(Continued)

*Primary Examiner* — Pamela Rodriguez
(74) *Attorney, Agent, or Firm* — Crowell & Moring LLP

(57) ABSTRACT

An electronically-controlled tractor protection control module in a tractor prevents air flow from an air reservoir to a gladhand when a signal is received that indicates a trailer is not coupled with the gladhand. This prevents air from being vented out the gladhand when the tractor's service brakes are applied. However, a failure can occur that prevents this signal from being received or acted upon, which would result in air being vented out the gladhand. To address this problem, an air flow restrictor is used to limit the amount of air that is vented in such a situation.

20 Claims, 10 Drawing Sheets

(56)                    References Cited

U.S. PATENT DOCUMENTS

| | | |
|---|---|---|
| 2011/0168505 A1 | 7/2011 | Hilberer |
| 2017/0174197 A1 | 6/2017 | Eberling |
| 2020/0094805 A1 | 3/2020 | Riley |
| 2020/0114896 A1 | 4/2020 | Kennedy |
| 2021/0009101 A1 | 1/2021 | Riley |
| 2021/0129810 A1 | 5/2021 | Niglas |
| 2021/0171001 A1 | 6/2021 | Leinung et al. |
| 2022/0032891 A1 | 2/2022 | Amtsfeld |
| 2024/0190410 A1* | 6/2024 | Komandur ........... B60T 13/662 |

FOREIGN PATENT DOCUMENTS

| | | |
|---|---|---|
| GB | 2569282 A | 6/2019 |
| WO | WO 2022/130077 A1 | 6/2022 |

OTHER PUBLICATIONS

Non-final Office Action dated Jul. 11, 2025 for U.S. Appl. No. 18/077,622.
"Bendix® TP-3® Tractor Protection Valve"; Service Data Sheet SD-03-3652, ReV. 008; Bendix Commercial Vehicle Systems LLC; Dec. 2019; 4 pages.
"Bendix® TP-5™ Tractor Protection Valve"; Service Data Sheet SD-03-3655, Bendix Commercial Vehicle Svstems LLC; May 2011: 4 pages.
"Bendix® MV-3® Dash Control Module"; Service Data Sheet SD-03-3415, Bendix Commercial Vehicle Sxstems LLC; Mar. 2012; 8 pages.
Non-final Office Action dated Feb. 4, 2026 for U.S. Appl. No. 18/077,622.

* cited by examiner

SYSTEM AND METHOD FOR FAILSAFE OPERATION OF A TRACTOR PROTECTION CONTROL MODULE

BACKGROUND

Today's heavy-duty commercial vehicles configured for towing ("tractors") are normally designed with two isolated braking circuits providing control of a steer axle (or steer axle group) and a rear axle (or rear axle group). Protected and isolated supply and control air signals can be provided from both circuits to a towed vehicle (a "trailer") to provide braking on the trailer.

SUMMARY

The following embodiments generally relate to a system and method for failsafe operation of a tractor protection control module. In one embodiment, a tractor protection system is provided comprising an electronically-controlled tractor protection controller and a flow rate restrictor. The electronically-controlled tractor protection controller comprises an output port configured to be coupled with a braking system of a trailer; at least one input port configured to receive air from at least one reservoir; a relay comprising a control port, a source port that receives air from the at least one reservoir, and a drain port coupled with the output port, wherein the relay is configured to selectively allow air to flow between the source port and the drain port in response to a pneumatic signal received at the control port; and a solenoid valve configured to selectively prevent pneumatic signal from being applied to the control port in response to an electrical signal received by the electronically-controlled tractor protection controller indicating that the tractor is not coupled with the trailer. The flow rate restrictor positioned between one of the at least one reservoir and the source port of the relay, wherein the flow rate restrictor is configured to restrict a flow rate of air supplied from the one of the at least one reservoir to the source port of the relay to no greater than a rate at which a compressor of the tractor is able to refill the one of the at least one reservoir with air.

In another embodiment, a method is provided comprising: supplying air from a first reservoir in a tractor to a relay that controls air flow to a braking system of a trailer in response to the first reservoir being at or above a first pressure; supplying air from a second reservoir in the tractor to the relay in response to the first reservoir not being at or above the first pressure; and restricting a rate at which air is supplied from the second reservoir to the relay to prevent a pressure in the second reservoir from dropping below a second pressure that would cause the tractor to automatically park.

In yet another embodiment, a system is provided comprising an electronic tractor protection module configured to prevent air flow to a trailer gladhand in response to a signal indicating that a trailer is not coupled with the trailer gladhand; and means for limiting an amount of air supplied from a reservoir in the tractor to the trailer gladhand after a failure prevents the electronic tractor protection module from preventing air flow to the trailer gladhand even though the trailer is not coupled with the trailer gladhand.

Other embodiments are possible, and each of the embodiments can be used alone or together in combination.

DETAILED DESCRIPTION

Figure 1:
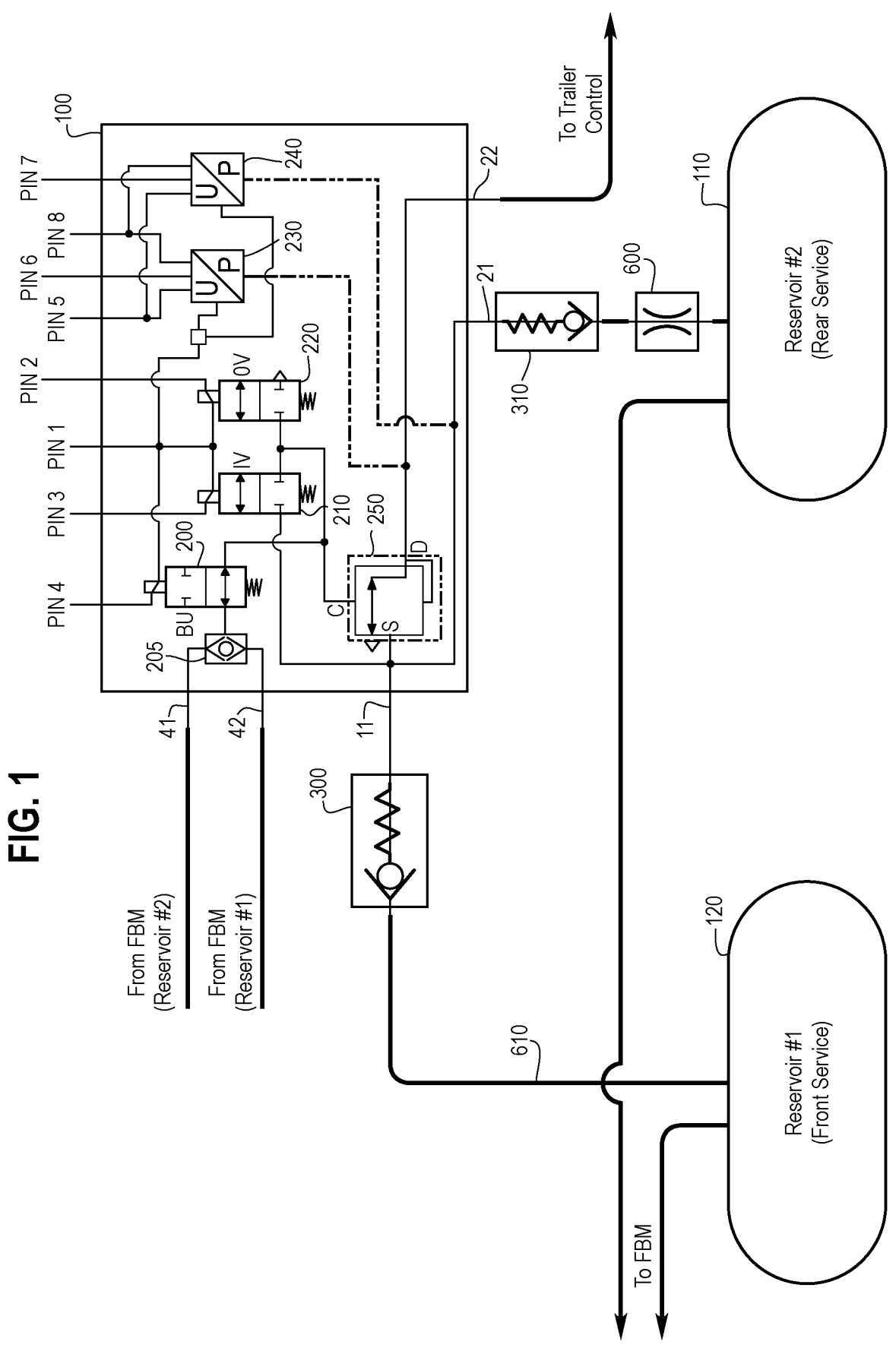
FIG. 1 is a diagram of a tractor protection system of an embodiment in which a flow rate restrictor comprises a small diameter supply line.

By way of overview, an electronically-controlled tractor protection control module in a tractor can prevent air flow from an air reservoir to a gladhand when a signal is received that indicates a trailer is not coupled with the gladhand. This prevents air from being vented out the gladhand when the tractor's service brakes are applied. However, a failure can occur that prevents this signal from being received or acted upon, which would result in air being vented out the gladhand. To address this problem, an air flow restrictor is used to limit the amount of air that is vented in such a situation. One example of such an air flow restrictor is shown in FIG. 1 (other types of air flow restrictors can be used). This and other embodiments will be discussed below.

Figure 2:
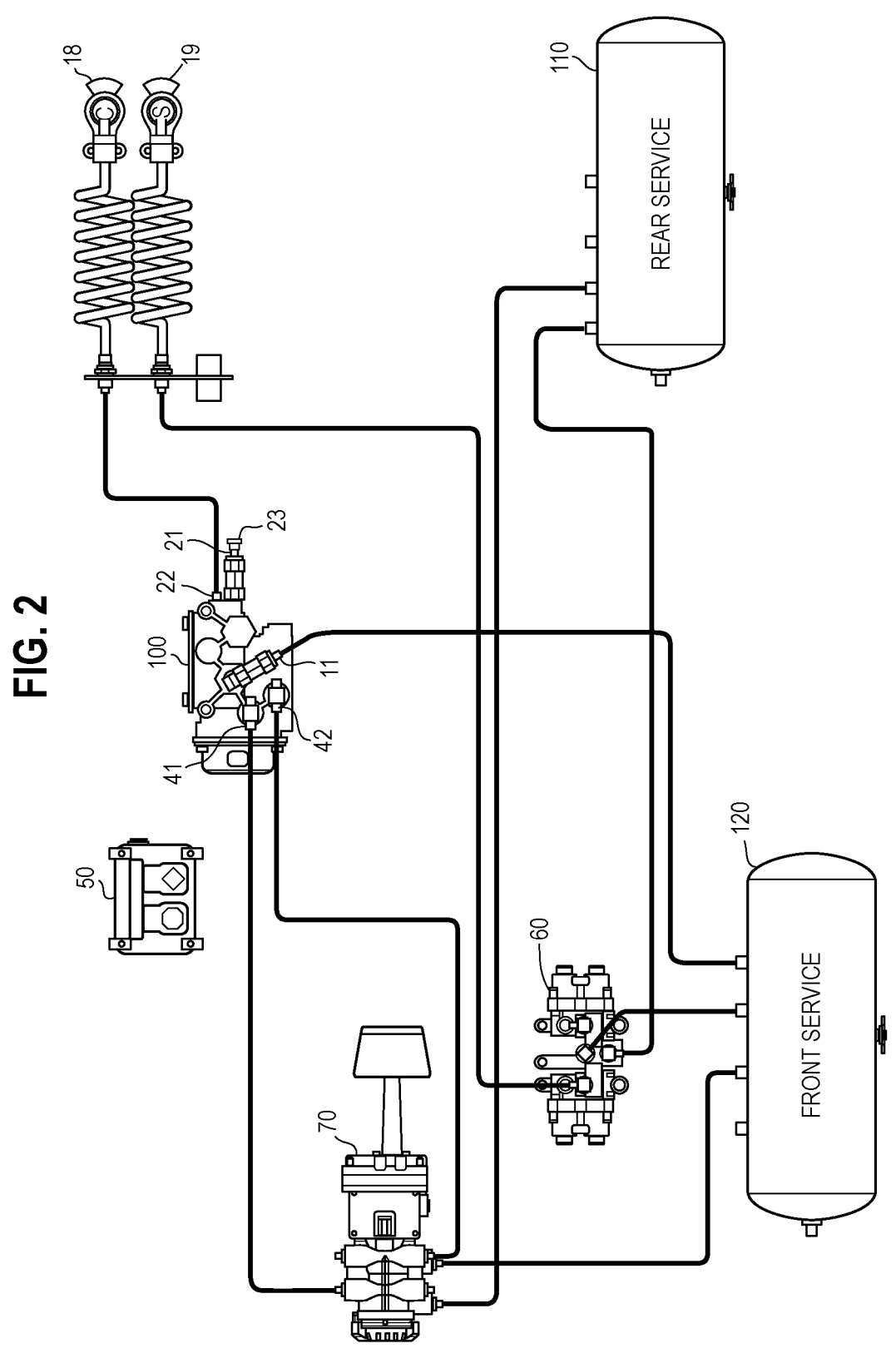
FIG. 2 is a diagram of a braking sub-system of an embodiment.

Turning now to the drawings, FIG. 2 is a diagram of a braking sub-system of an embodiment. As shown in FIG. 2, in this embodiment, the braking sub-system comprises a dash control module 50, a park valve module 60, a foot brake module 70, an electronically-controlled tractor protection controller (control module) 100, a rear service air reservoir 110, and a front service air reservoir 120. In one embodiment, this braking sub-system is located in a tractor and pneumatically communicates with a braking system of a trailer via gladhands 18, 19. Other components of the vehicle's braking system (such as the tractor's service and parking brakes) are not shown to simplify the drawing.

The rear and front service reservoirs 110, 120 of the braking sub-system are configured to store pressurized air supplied by a compressor (not shown), and the pressurized air in these reservoirs 110, 120 is used to supply and control various braking components on front and rear axles of the tractor to decelerate the tractor. In this embodiment, the rear service reservoir 110 is part of a braking circuit that provides pneumatic pressure to the braking components of the rear axle(s) of the tractor, and the front service reservoir 120 is part of a separate braking circuit that provides pneumatic pressure to the braking component of the front axle(s) of the tractor. Accordingly, the braking system of the tractor of this embodiment has two isolated braking circuits: one providing braking of the rear axle(s) and another providing braking of the front axle(s).

The rear and front service reservoirs 110, 120 are coupled with respective valves in the foot brake module 70 via air hoses (lines) or the like. The foot brake module 70 comprises a brake pedal (e.g., a suspended pedal, where the valve is mounted above the pedal, or a treadle, which pivots directly on the valve mounted below the treadle). Actuation of the brake pedal causes the two valves to open proportional to the amount of actuation of the brake pedal, which causes pneumatic pressure supplied from the rear and front reservoirs 110, 120 to be supplied out of outlet ports of the foot brake module 70 in proportion to the amount of actuation of the brake pedal. The outlet ports of the foot brake module 70 are coupled with service brake components (not shown) of the tractor.

This braking sub-system is also used to control braking of the trailer towed by the tractor. In addition to applying pressurized air to the service brakes of the tractor, pressurized air from the foot brake module 70 is also sent to the trailer via gladhand 18 to provide a control signal to actuate brakes on the trailer. In this embodiment, gladhand 19 is used to supply pressurized air from the rear or front service reservoirs 110, 120 to the trailer, and that air is used to apply service braking in the trailer in response to pneumatic control signals received via gladhand 18. Pressurized air from gladhand 19 is also used to release the parking brakes of the trailer. In this embodiment, the trailer has spring brakes that place the trailer in a parked state in the absence of pressurized air. To un-park the vehicle, a driver can cause pressurized air to flow on the supply line of gladhand 19, and that air is applied to the spring brakes in the trailer to un-park the trailer. For example, the dash control module 50 can comprise a push-pull button that, when pushed in, causes the park valve module 60 to open. The park valve module 60 receives pressurize air from the rear and front service reservoirs 110, 120, and the greater pressure is applied from the park valve module 60 in response the push-pull button being pushed in. That air is sent, via gladhand 19, to the trailer to release the spring parking brakes. Another push-pull button on the dash control module 50 can cause the park valve module 60 to apply air to release the spring parking brakes in the tractor.

As mentioned above, in addition to un-parking the spring brakes of the trailer, the pressurized air on the service line is used to supply the service brakes of the trailer in response to a pneumatic control signal supplied on the control line to gladhand 18. In one embodiment, the pressurized air from gladhand 19 is used to fill reservoir(s) in the trailer, and the pneumatic control signal supplied on gladhand 18 causes air to flow from the reservoir(s) to the braking components on the trailer. As will be discussed below, the tractor protection controller 100 is used to supply the pneumatic control signal to the trailer and can be used to prevent or control venting control air when a trailer is not connected to the tractor. This is referred to herein as "tractor protection."

As shown in FIG. 2, the tractor protection controller 100 comprises inlet ports 41, 42 that receive pressurized air from the rear and front service reservoirs 110, 120 in response to actuation of the brake pedal of the foot brake module 70. The tractor protection controller 100 also receives pressurized air from the front reservoir 120 via port 11. Based on the amount of pressurized air received from the foot brake module 70, the tractor protection controller 100 causes a proportional amount of pressurized air received from the park valve module 60 to output at port 22, which is coupled with the control line that leads to gladhand 18. This supplied air is the control air sent to the trailer to control the trailer's braking system. The tractor protection controller 100 also comprises port 21, which is used in some embodiments or is capped off with a cap 23 or not present in other embodiments.

Figure 3:
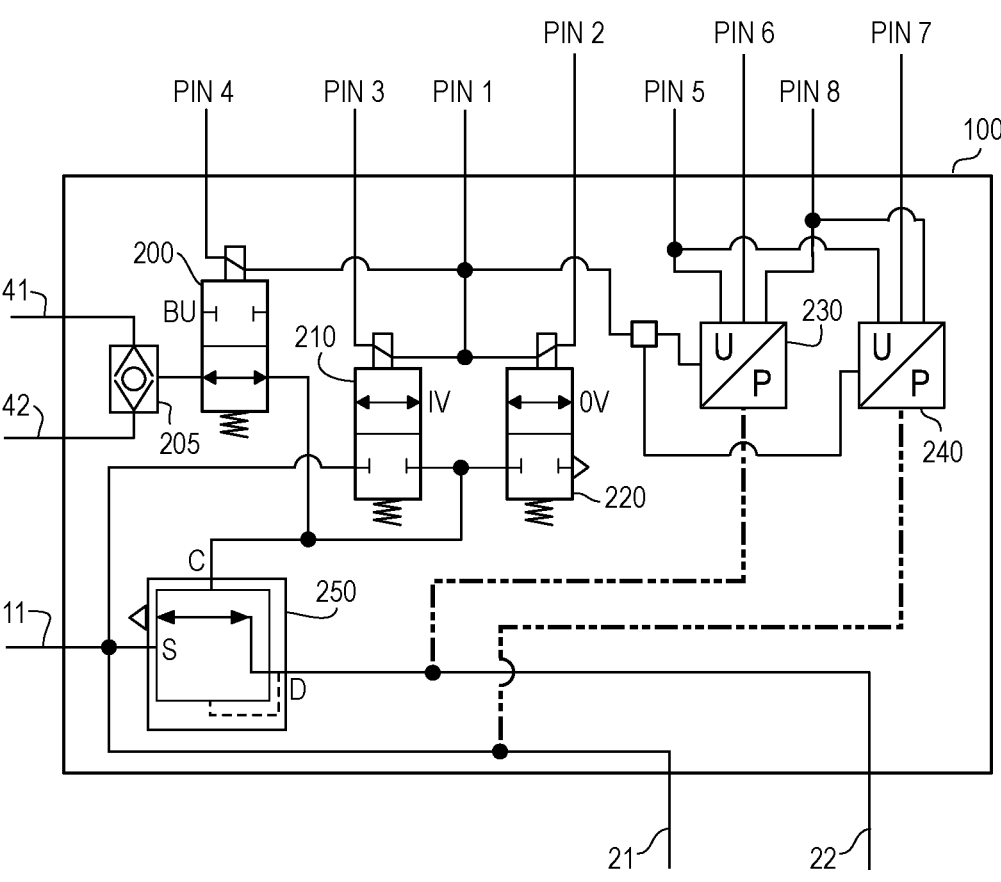
FIG. 3 is a diagram of an electronically-controlled tractor protection controller of an embodiment.

FIG. 3 shows example components of one particular implementation of the tractor protection controller 100. As shown in FIG. 3, the tractor protection controller 100 of this embodiment comprises a double check valve 205, a solenoid backup (BU) valve 200, solenoid input and output valves (IV, OV) 210, 220, pressure sensors 230, 240, and a relay 250. The solenoid valves 200, 210, 220 and the pressure sensors 230, 240 are electronically coupled with an electronic braking controller (not shown) of the tractor. The braking controller can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The braking controller can be configured with hardware and/or firmware to perform the various functions described herein.

In the default state shown in FIG. 3, the solenoid backup (BU) valve 200 is open, and the solenoid input and output valves (IV, OV) 210, 220 are closed. In this state, when the tractor protection controller 100 receives pressurized air from the two circuit lines of the foot brake module 70 via ports 41 and 42, the double check valve 205 allows the air of the greater pressures from ports 41 and 42 to flow through the open solenoid backup (BU) valve 200 to the control port (C) of the relay 250. The presence of pressurized air at the control port (C) of the relay 250 causes the relay 250 to open in proportion to the amount of pressurized air received. This causes air received at the source port (S) of the relay 250 to flow out of the drain port (D) of the relay 250, in proportion to the control signal, and out of port 22 of the tractor protection controller 100. (In this example, port 21 is capped off or not present). Pressure sensors 230, 240 measure the pressure at the source and drain, respectively, of the relay 250. That information and related control signals can be communicated to/from the braking controller via the shown pins.

In the above example, the application of air to the trailer via output port 22 was initiated by the driver actuating the brake pedal. The braking controller can also cause application of air to the trailer without driver input (e.g., to provide anti-lock braking system (ABS) or electronic braking system (EBS) functionality). To do this, the braking controller can send electronic signals via the shown pins to the solenoid input and output valves (IV, OV) 210, 220 to selectively cause the valves 210, 220 to move from their default closed state to an open state and vice versa. This would cause air from input port 11 to flow to the control port (C) of the relay 250, as controlled by the braking controller, to open the relay 250 and deliver air from port 22 without input from the foot brake module 70.

The braking controller can also apply an electronic signal via port 4 to close the solenoid backup (BU) valve 200. When this valve is closed, air received by the tractor protection controller 100 from the foot brake module 70 would be prevented from being sent to the control port (C) of the relay 250. This would prevent air from flowing out of outlet port 22. The braking controller can provide such a signal when it detects that the trailer is not pneumatically connected with the tractor. This can occur, for example, when the tractor is being operated without a trailer (i.e., in bobtail mode) or when the gladhands 18, 19 become disconnected from the trailer. The braking controller can be notified of this situation by the park valve module 60 or by some other pneumatic or electrical mechanism that detects a discontinuity in the pneumatic or other type of connections between the tractor and trailer. In these types of situations, when the driver presses the brake pedal, control air would flow out of the gladhands 18, 19 into the atmosphere, eventually depleting the air in the rear and front service reservoirs 110, 120. This can result in an insufficient amount of pressurized air in the rear and front service reservoirs 110, 120 to apply service brakes in the tractor and/or cause the tractor or trailer to automatically park.

To address this situation, Federal Motor Vehicle Safety Standard (FMVSS) No. 121 requires a "tractor protection system." To provide tractor protection on the service line, the park valve module 60 can be configured to output air to the service line only when a pressure on the service line exceeds a threshold that indicates that the trailer is connected. To provide tractor protection on the control line, a mechanical tractor protection value can be employed that uses the service line pressure to open the valve to allow control air to flow. So, if the trailer is present, the park valve module 60 would allow service line air to flow to the tractor protection value, causing it to open to allow the control line air to flow. Conversely, if the trailer is not present, the park valve module 60 would not allow service line air to flow to the tractor protection value, leaving the value in a closed state, which would prevent control line air to flow.

Through the use of the solenoid backup (BU) valve 200, the tractor protection controller 100 can provide tractor protection on the control line without the use of a mechanical valve. As discussed above, if the braking controller determines that the trailer is not pneumatically connected to the tractor, the braking controller can send a signal on pin 4 to command the solenoid backup (BU) valve 200 to close. This would prevent air from the foot brake module 70 from reaching the control port (C) of the relay 250 to open the relay 250, thus preventing air from the supply port 11 from flowing out of the output port 22 of the tractor protection controller.

However, if the braking controller is unable to operate (e.g., the braking controller is unpowered, has faulted or lost power, is in some other failed state, etc.), the braking controller would be unable to supply the electrical signal on pin 4 to close the solenoid backup (BU) valve 200. With this valve 200 being open in the absence of such electrical signal, air from the foot brake module 70 would flow through the valve 200 and cause the relay 250 to open, which would allow air from the supply port 11 (and, eventually, supply port 21) to flow out of the output port 22 and into the atmosphere. So, as the driver presses the brake pedal, a significant quantity of air pressure from both reservoirs 110, 120 will be vented out the open gladhand 18. The driver would have no ability to prevent this air loss, and if the driver presses the brake pedal for an extended amount of time, it could result in the system air pressure dropping low enough that the vehicle's parking brakes are automatically applied. Thus, a failure in the braking controller would cause the tractor protection controller 100 to lose its ability to protect the tractor.

To address this situation, the following embodiments provide a tractor protection system that includes the electronically-controlled tractor protection controller 100 and a flow rate restrictor, which can be external to or internal to the tractor protection controller 100. The flow rate restrictor restricts the flow of air that is supplied from the rear service reservoir 110 to the relay 250 of the tractor protection controller 100 to no greater than a rate at which a compressor of the tractor is able to refill the rear service reservoir 110. So, even if there is a failure that prevents the electronically-controlled tractor protection controller 100 from closing the solenoid valve 200, the air that is vented is controlled in such a way that the rear service reservoir 110 will not be drop below the pressure level that will cause the tractor to automatically park.

So, in a failure scenario, an open gladhand 18 would deliver the full pressure available from the front service reservoir 120 because that is not restricted, but the rear service reservoir 110, because it is restricted, would reach an equilibrium point where the tank pressure is lower than the cut-in pressure of the compressor. That is, by sufficiently restricting the available airflow from the rear service reservoir 110, the compressor will be able to refill that reservoir 110 if the compressor's refill rate is greater than the restricted airflow rate (i.e., the compressor can "keep up" with the lost air). This means that even if the front service reservoir 120 is completely depleted, the rear service reservoir 110 will remain above the parking brake application pressure, so the parking brakes will not apply. It should be noted that while the rear service reservoir 110 is restricted in these examples, the front service reservoir 120 (or another reservoir) can be restricted instead.

The following paragraphs provide several examples on how the airflow from one of the reservoirs can be restricted. It should be understood that these are merely examples and that other implementations can be used. Accordingly, the details presented herein should not be read into the claims unless expressly recited therein.

Figure 4:
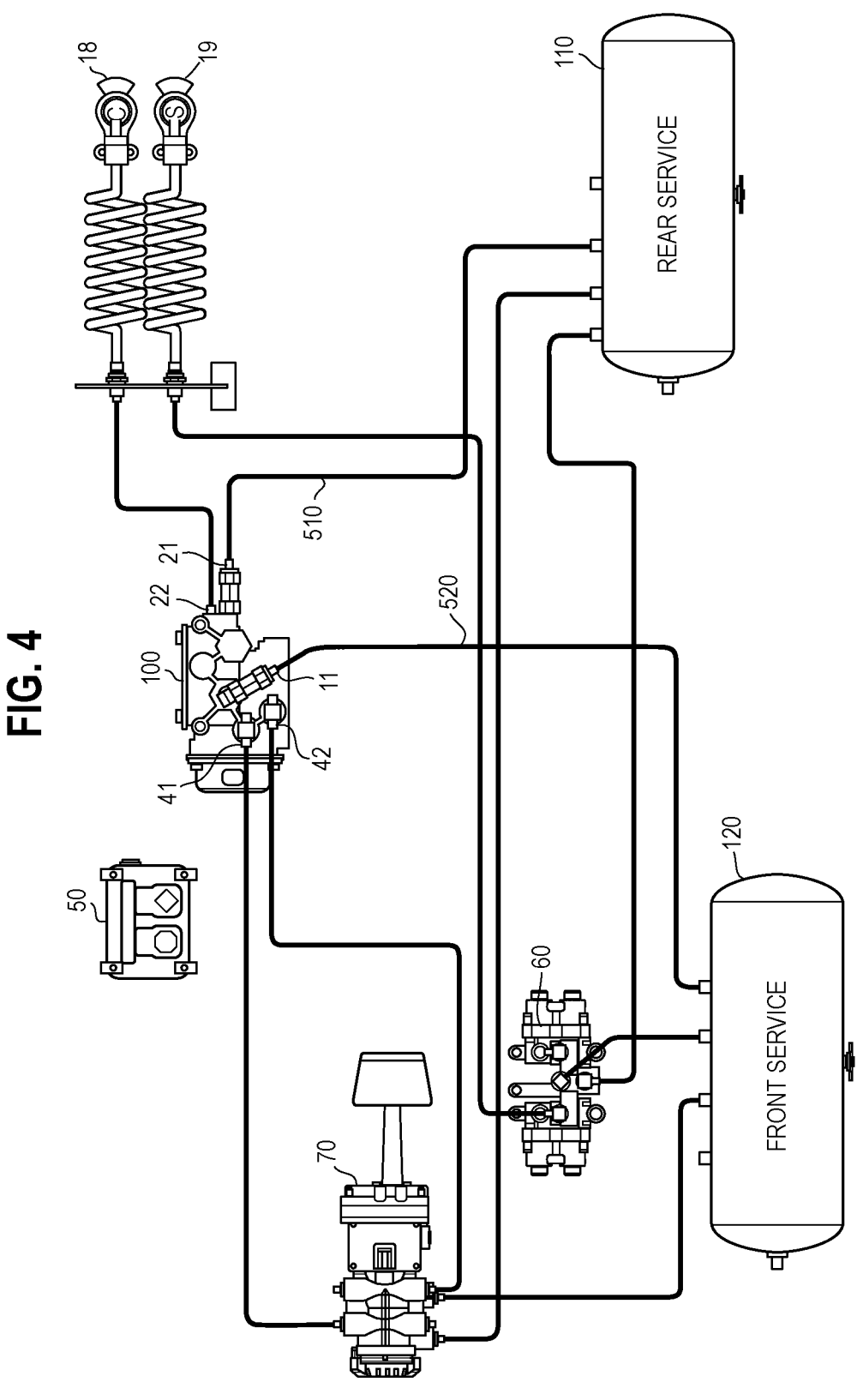
FIG. 4 is a diagram of a braking sub-system of an embodiment.

Returning to FIG. 1 and also with reference to FIG. 4, in this embodiment, the rear service reservoir 110 is connected to port 21 via a pneumatic communication channel/line (e.g., a hose 510). The hose 510 has a sufficiently-small diameter to limit the amount of airflow available to the tractor protection controller 100 so that the compressor can keep up with the loss of air. For example, in one implementation, the outer diameter of hose 520 is ⅝ inch, whereas the outer diameter of hose 510 is ¼ inch or ⅜ inch. It is important to note that these are merely examples and that any suitable diameter hose can be used. Also, instead of using a smaller-diameter hose, a restrictor can be placed between the rear service reservoir 110 and port 21.

In this embodiment, under normal operation, the tractor protection controller 100 is supplied largely by the front service reservoir 120 due to the higher flow capacity of its hose 520. In a failure scenario where the tractor protection controller 100 has lost the ability to perform tractor protection, the tractor protection controller 100 will be supplied largely by the front service reservoir 120 until pressure in that reservoir 120 drops below the supply pressure coming from the rear service reservoir 110. When that happens, the single check valve 300 on port 11 closes, and the single check valve 310 on port 21 opens. This causes the tractor protection controller 100 to be supplied (at a lower flow rate due to the small diameter line) by the rear service reservoir 110 via port 21. Because the small diameter supply line 600 acts to limit the air flow rate, the rate of air consumption drops below the level that the air system and compressor can keep up with.

Figure 5:
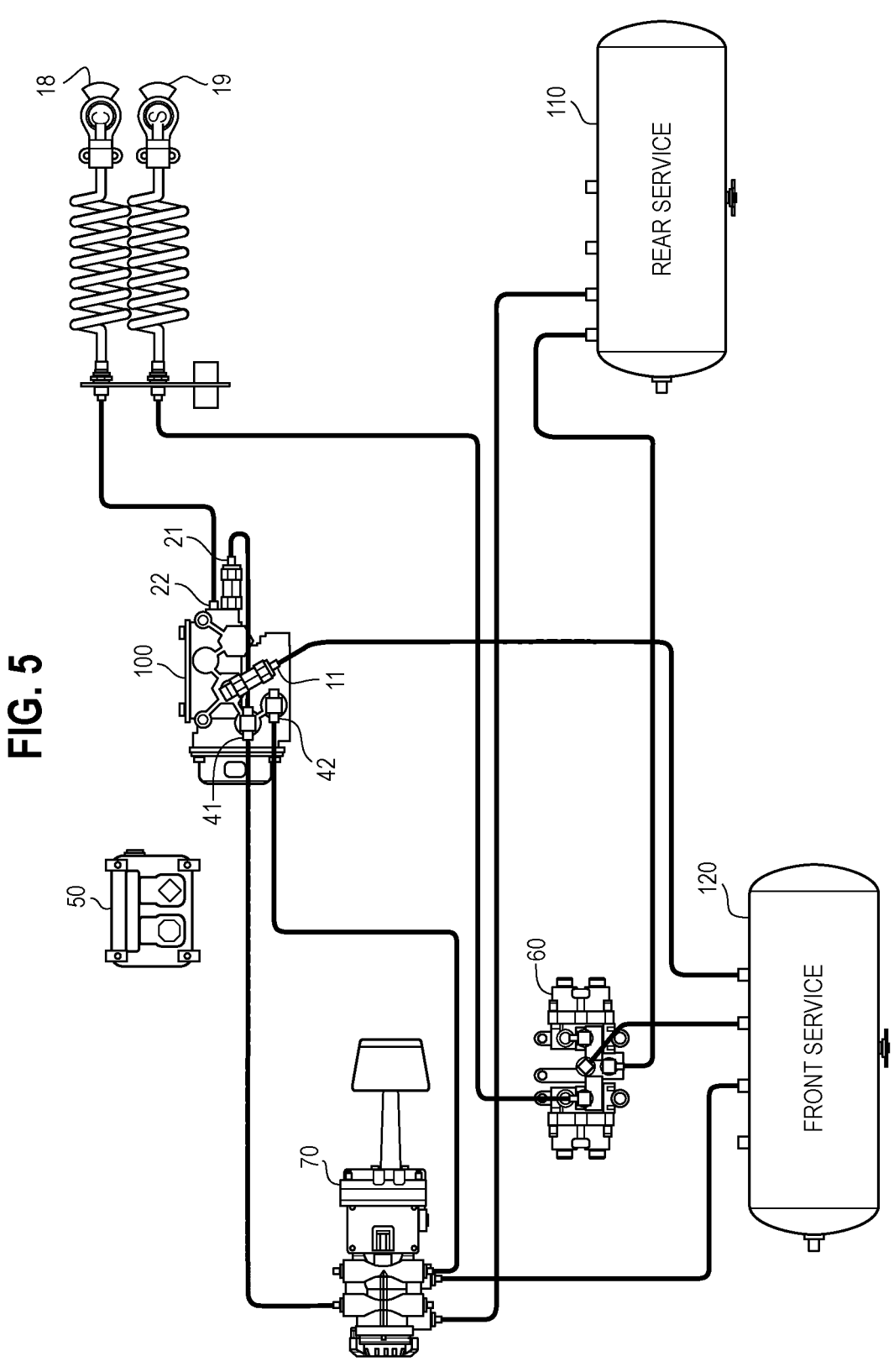
FIG. 5 is a diagram of a tractor protection system of an embodiment in which a flow rate restrictor comprises a foot brake module.
Figure 6:
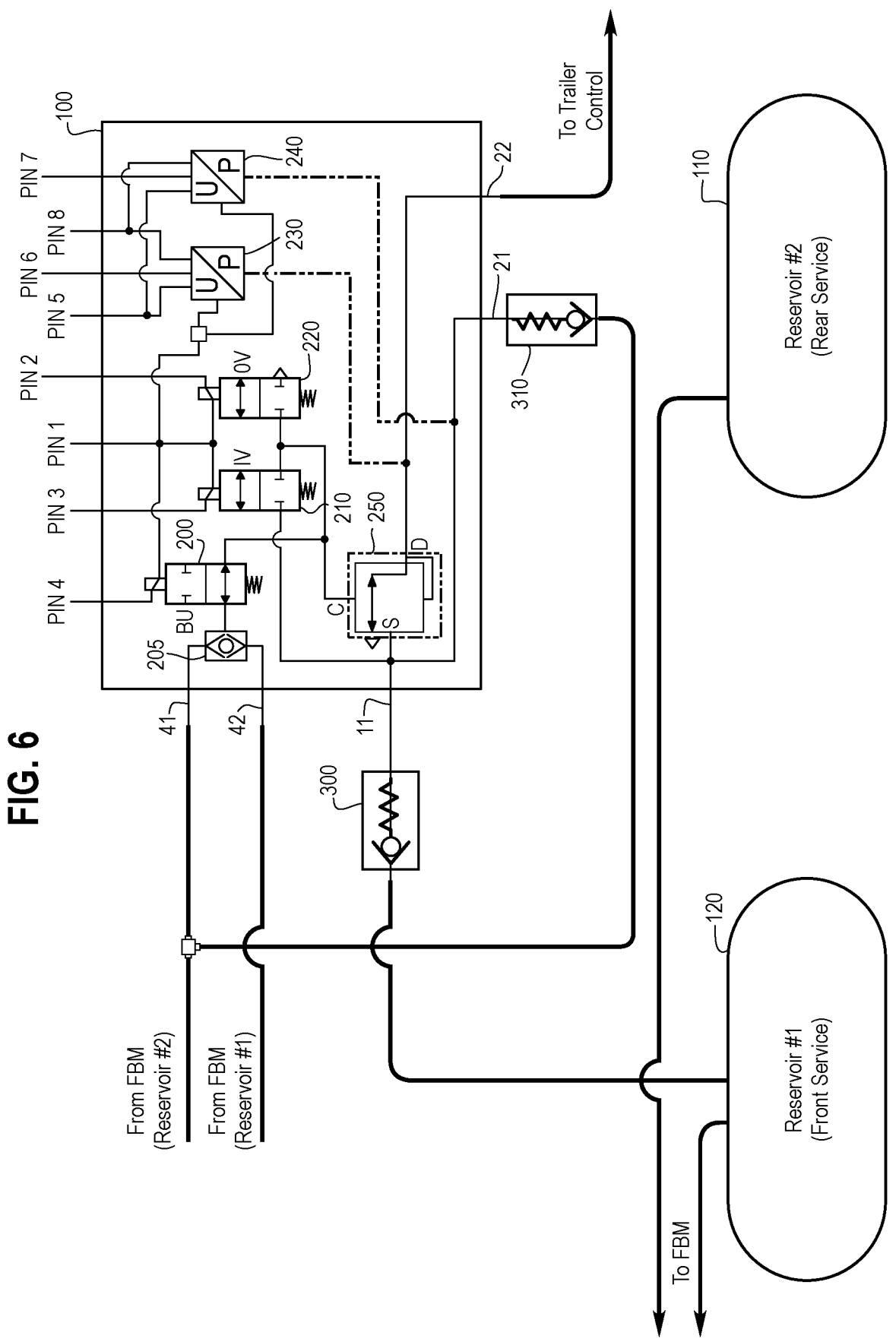
FIG. 6 is a diagram of a braking sub-system of an embodiment.

Another embodiment is shown in FIG. 5. This diagram is similar to the diagram in FIG. 2 except that the air supplied from the rear service reservoir 110 circuit is provided on input port 21, in addition to indirectly on input port 41. This is shown in more detail in FIG. 6. As also shown in FIG. 6, a single check valve 300 is used on input port 11, and another single check valve 310 is used on input port 21.

Although these check valves 300, 310 are shown external to the tractor protection controller 100, it should be understood that one or more of these check valves 300, 310 can be located internal to the tractor protection controller 100.

In normal use, the tractor protection controller 100 is supplied largely by the front service (primary) reservoir 120 via port 11. The single check valve 300 on port 11 prevents air from flowing back from the tractor protection controller 100 to the front service reservoir 120 if that reservoir 120 becomes depleted. The single check valve 310 on port 21 prevents air from flowing back from the tractor protection controller 100 to the foot brake module (FBM) 70. In a failure scenario where the tractor protection controller 100 has lost the ability to perform tractor protection, the tractor protection controller 100 will be supplied by the front service reservoir 120 until pressure in that reservoir 120 drops below the service application pressure coming from the FBM line that supplies port 41 (from the rear service reservoir 110). When that happens, the single check valve 300 on port 11 closes and the single check valve 210 on port 21 opens. In this state, the tractor protection controller 100 is supplied (at a lower rate) by the FBM line that supplies port 41 (from the rear service reservoir 110). Because the foot brake module 60 acts to orifice the air, the rate of air consumption becomes something the air system and compressor can keep up with. That is, even with the relay 250 open and air from port 21 being vented out of port 22 when the driver presses the brake pedal, the rate of air flow out of port 22 is less than the rate at which the compressor can refill the rear service reservoir 110. This will prevent the rear service reservoir 110 for completely depleting, which allows the service brakes to be applied on the tractor and avoids the auto-park problem discussed above.

Figure 7:
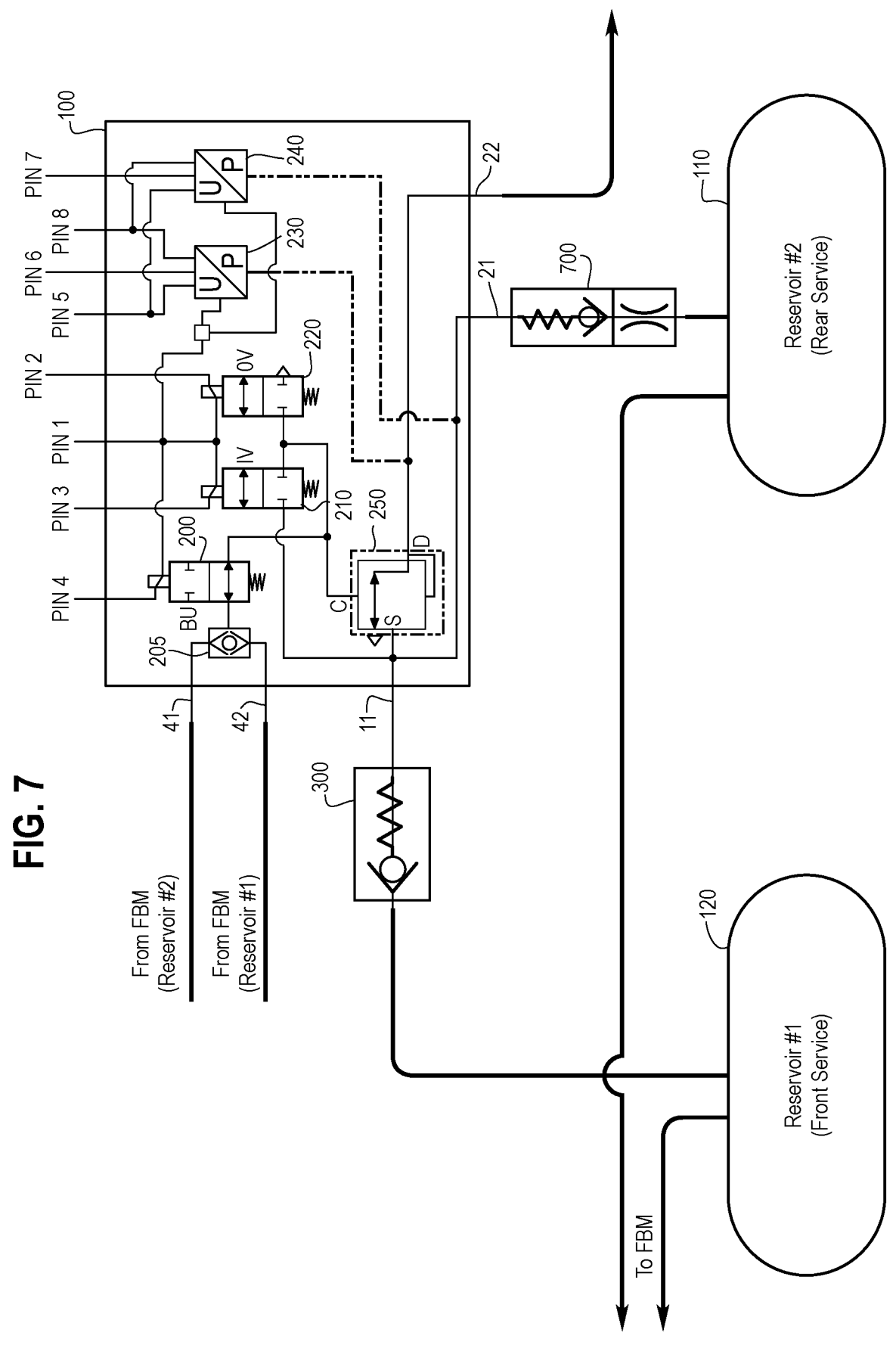
FIG. 7 is a diagram of a tractor protection system of an embodiment in which a flow rate restrictor comprises an orifice single check valve.

In yet another embodiment (shown in FIG. 7), an orifice single check valve 700 is used. Under normal operation, the tractor protection controller 100 is supplied largely by the front service reservoir 120 due to higher flow capacity. In a failure scenario where the tractor protection controller 100 has lost the ability to perform tractor protection, the tractor protection controller 100 will be supplied largely by the front service reservoir 120 until pressure in that reservoir 120 drops below the supply pressure coming from the rear service reservoir 110. When that happens, the single check valve 300 on port 11 closes, and the orifice single check valve 700 on port 21 opens. Because the orifice check valve 700 limits the air flow rate, the rate of air consumption drops below the level that the air system and compressor can keep up with.

Figure 8:
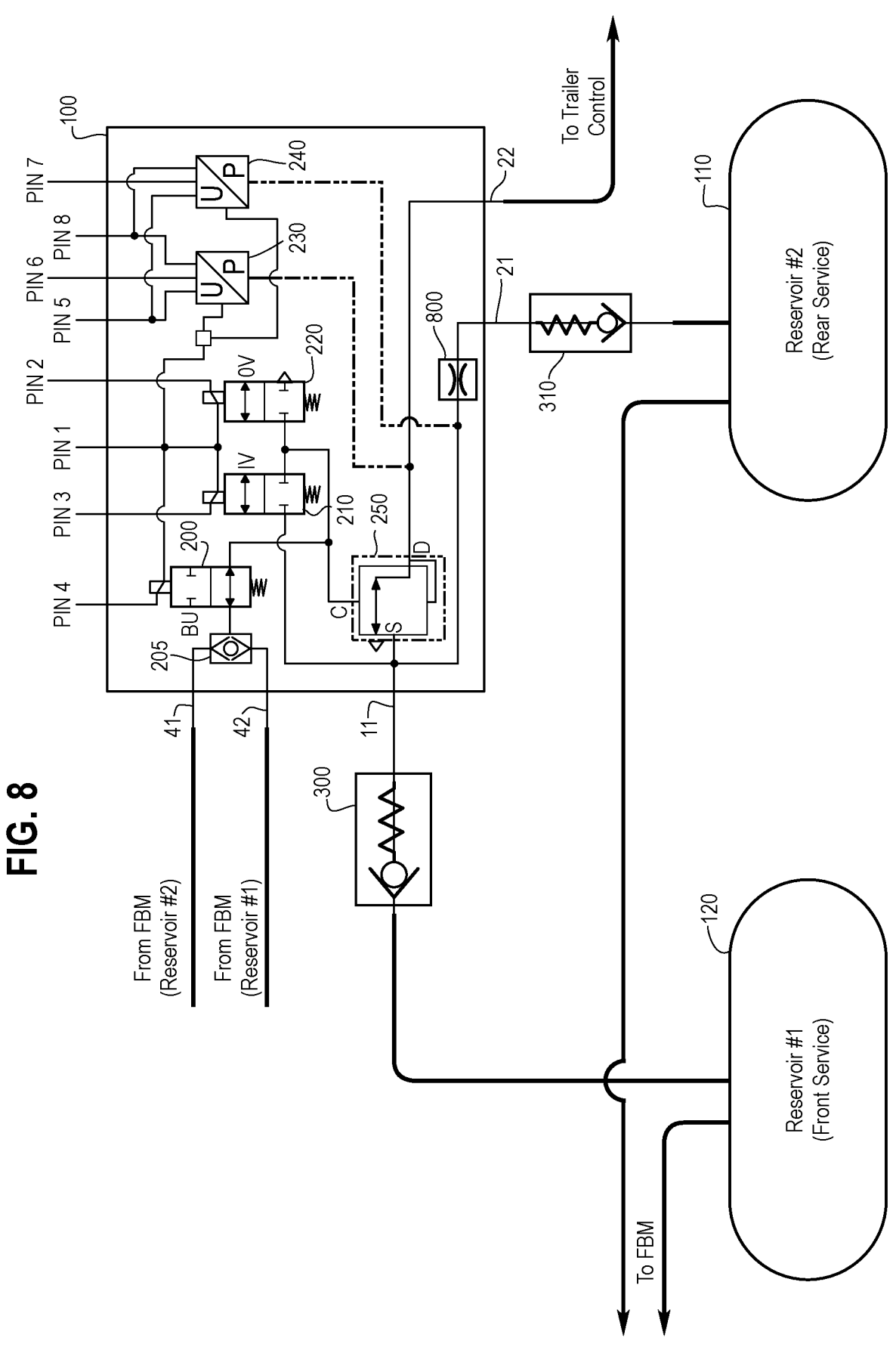
FIG. 8 is a diagram of a tractor protection system of an embodiment in which a flow rate restrictor comprises an internal orifice.

In another embodiment (shown in FIG. 8), an internal orifice 800 is used instead of the orifice single check valve 700. Moving the orifice inside the tractor protection controller 100 reduces the risk of assembly error. Under normal operation, the tractor protection controller 100 is supplied largely by the front service reservoir 120 due to higher flow capacity and the internal orifice 800 on the rear service reservoir 110. In a failure scenario where the tractor protection controller 100 has lost the ability to perform tractor protection, the tractor protection controller 100 will be supplied largely by the front service reservoir 120 until pressure in that reservoir 120 drops below the supply pressure coming from the rear service reservoir 110. When that happens, the single check valve 300 on port 11 closes, and the single check valve 310 on port 21 opens. This causes the tractor protection controller 100 to be supplied by the rear service reservoir 110 at a lower flow rate due to the internal/mechanical orifice 800 inside port 21. Because the orifice 800 limits the air flow rate, the rate of air consumption drops below the level that the air system and compressor can keep up with.

Figure 9:
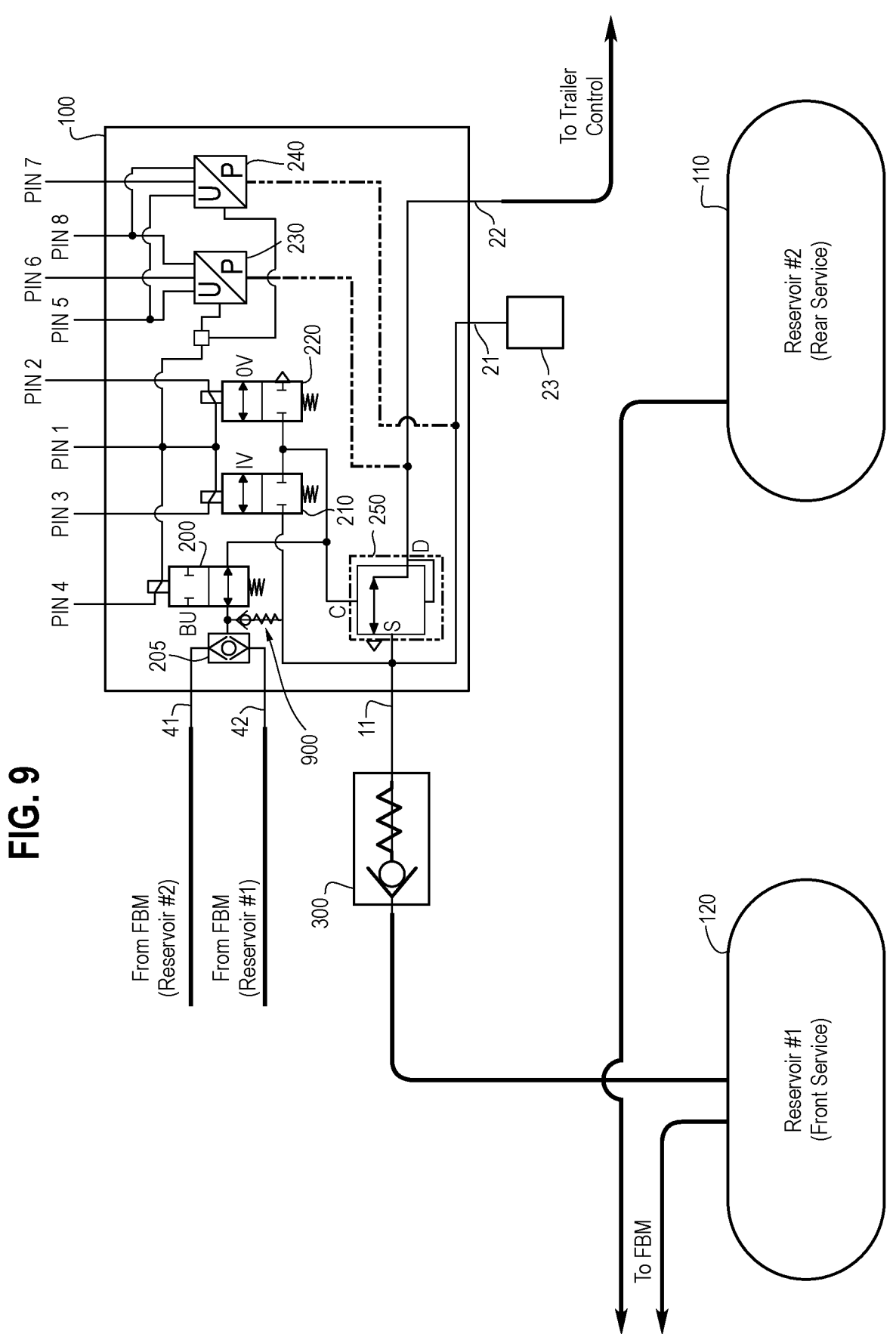
FIG. 9 is a diagram of a tractor protection system of an embodiment in which a flow rate restrictor comprises a single check valve.

In yet another embodiment (shown in FIG. 9), an internal single check valve 900 is positioned between the double check valve 205 and the source input of the relay 250. Under normal operation, the tractor protection controller 100 is supplied only by the front service reservoir 120, the pressure of which keeps the internal check valve 900 closed. In a failure scenario where the tractor protection controller 100 has lost the ability to perform tractor protection, the tractor protection controller 100 will be supplied largely by the front service reservoir 120 until pressure in that reservoir 120 drops below the supply pressure coming from the rear service reservoir 110. When that happens, the single check valve 300 on port 11 closes, and the tractor protection controller 100 is supplied (at a lower flow rate due to the system restriction in the foot brake module 60) by the control ports via the internal check valve 900. Because the foot brake module 60 and the rest of the system limits the air flow rate, the rate of air consumption drops below the level that the air system and compressor can keep up with. Also, because port 21 is not used in this embodiment, it can be eliminated or sealed with a plug 23.

Figure 10:
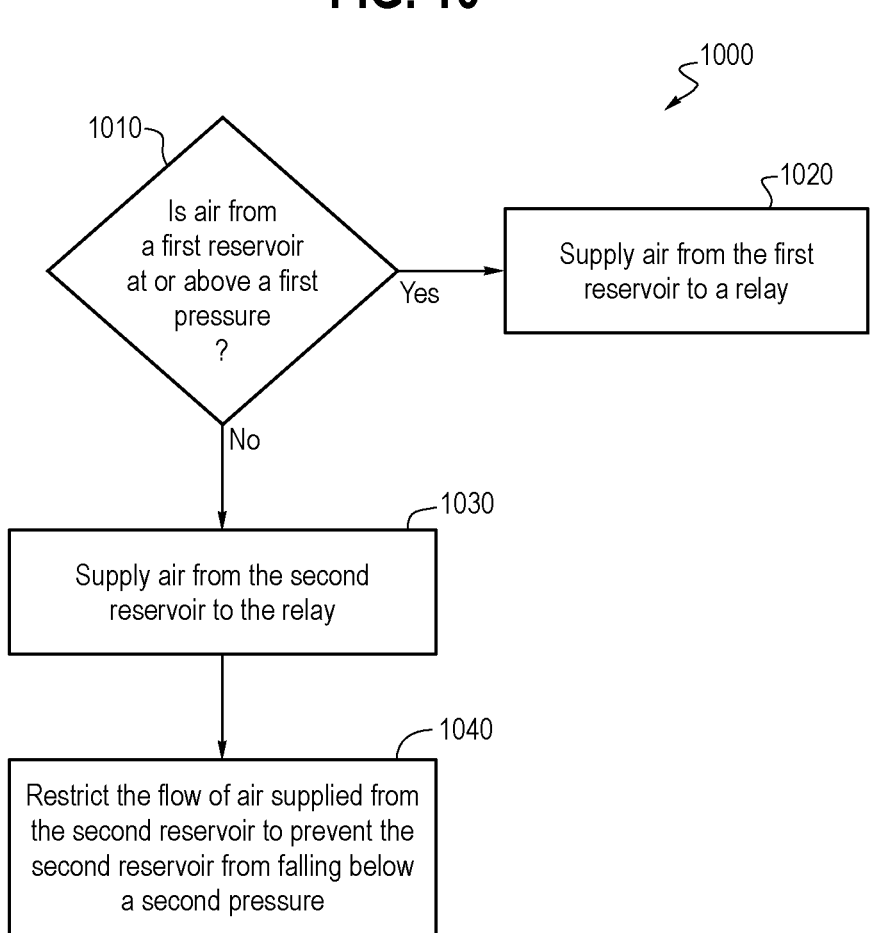
FIG. 10 is a flow chart of a method of an embodiment for failsafe operation of a tractor protection control module.

Turning again to the drawings, FIG. 10 shows a flow chart 1000 of a method of an embodiment for failsafe operation of a tractor protection control module. As shown in FIG. 10, a determination is made regarding whether air from a first reservoir is at or above a first pressure (act 110). If it is, air is supplied from the first reservoir to a relay (act 1020). If it is not, air is supplied from a second reservoir to the relay (act 1030) and the flow of air supplied from the second reservoir to the relay is restricted to prevent the second reservoir from falling below a second pressure (act 1040).

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A tractor protection system comprising:
an electronically-controlled tractor protection controller comprising:
an output port configured to be coupled with a braking system of a trailer;
at least one input port configured to receive air from at least one reservoir;
a relay comprising a control port, a source port that receives air from the at least one reservoir, and a drain port coupled with the output port, wherein the relay is configured to selectively allow air to flow between the source port and the drain port in response to a pneumatic signal received at the control port; and a solenoid valve configured to selectively prevent the pneumatic signal from being applied to the control port in response to an electrical signal received by the electronically-controlled tractor protection controller indicating that the tractor is not coupled with the trailer; and a flow rate restrictor positioned between one of the at least one reservoir and the source port of the relay, wherein the flow rate restrictor is configured to restrict a flow rate of air supplied from the one of the at least one reservoir to the source port of the relay to no greater than a rate at which a compressor of the tractor is able to refill the one of the at least one reservoir with air.

2. The tractor protection system of claim 1, wherein the flow rate restrictor protects against loss of air in the one of the at least one reservoir in an event in which the solenoid valve does not close even though the tractor is not coupled with the trailer.

3. The tractor protection system of claim 1, wherein the flow rate restrictor comprises a foot brake module.

4. The tractor protection system of claim 1, wherein the flow rate restrictor comprises a restricted supply line coupling the one of the at least one reservoir and the at least one input port of the electronically-controlled tractor protection controller.

5. The tractor protection system of claim 1, wherein the flow rate restrictor comprises an orifice single check valve positioned between the one of the at least one reservoir and the at least one input port of the electronically-controlled tractor protection controller.

6. The tractor protection system of claim 1, wherein the flow rate restrictor comprises an air restrictor located internal to the electronically-controlled tractor protection controller.

7. The tractor protection system of claim 1, wherein the flow rate restrictor comprises a single check valve positioned between the source port of the relay and a port of the electronically-controlled tractor protection controller that is configured to receive driver braking input.

8. The tractor protection system of claim 1, wherein the flow rate restrictor further comprises:

a first single check valve configured to couple one of the at least one input port of the electronically-controlled tractor protection controller to the one of the at least one reservoir; and a second single check valve configured to another one of the at least one input port of the electronically-controlled tractor protection controller to another one of the at least one reservoir.

9. A method comprising:

using a relay in an electronically-controlled tractor protection controller to selectively allow air to flow between a source port and a drain port in response to a pneumatic signal received at a control port;

using a solenoid valve to selectively prevent the pneumatic signal from being applied to the control port in response to an electrical signal received by the electronically-controlled tractor protection controller indicating that a tractor is not coupled with a trailer; and using a flow rate restrictor to restrict a flow rate of air supplied from one of at least one reservoir to the source port of the relay to no greater than a rate at which a compressor of the tractor is able to refill the one of the at least one reservoir with air.

10. The method of claim 9, wherein the flow rate restrictor protects against loss of air in the one of the at least one reservoir in an event in which the solenoid valve does not close even though the tractor is not coupled with the trailer.

11. The method of claim 9, wherein the flow rate restrictor comprises a foot brake module.

12. The method of claim 9, wherein the flow rate restrictor comprises a restricted supply line coupling the one of the at least one reservoir and at least one input port of the electronically-controlled tractor protection controller.

13. The method of claim 9, wherein the flow rate restrictor comprises an orifice single check valve positioned between the one of the at least one reservoir and at least one input port of the electronically-controlled tractor protection controller.

14. The method of claim 9, wherein the flow rate restrictor comprises an air restrictor located internal to the electronically-controlled tractor protection controller.

15. The method of claim 9, wherein the flow rate restrictor comprises a single check valve positioned between the source port of the relay and a port of the electronically-controlled tractor protection controller that is configured to receive driver braking input.

16. The method of claim 9, further comprising:

a first single check valve configured to couple one of at least one input port of the electronically-controlled tractor protection controller to the one of the at least one reservoir; and a second single check valve configured to another one of the at least one input port of the electronically-controlled tractor protection controller to another one of the at least one reservoir.

17. A system comprising:

an electronically-controlled tractor protection controller comprising:

an output port configured to be coupled with a braking system of a trailer;

at least one input port configured to receive air from at least one reservoir;

a relay comprising a control port, a source port that receives air from the at least one reservoir, and a drain port coupled with the output port, wherein the relay is configured to selectively allow air to flow between the source port and the drain port in response to a pneumatic signal received at the control port; and a solenoid valve configured to selectively prevent the pneumatic signal from being applied to the control port in response to an electrical signal received by the electronically-controlled tractor protection controller indicating that the tractor is not coupled with the trailer; and means for restricting a flow rate of air supplied from the one of the at least one reservoir to the source port of the relay to no greater than a rate at which a compressor of the tractor is able to refill the one of the at least one reservoir with air.

18. The system of claim 17, wherein the means for restricting comprises a foot brake module.

19. The system of claim 17, wherein the means for restricting comprises an air restrictor.

20. The system of claim 17, wherein the means for restricting comprises an orifice single check valve.

* * * * *